(12) United States Patent
Weimin et al.

(10) Patent No.: US 11,185,052 B2
(45) Date of Patent: Nov. 30, 2021

(54) PET SPRAY TRAINING SYSTEM

(71) Applicant: RADIO SYSTEMS CORPORATION, Knoxville, TN (US)

(72) Inventors: Bai Weimin, GuangDong (CN); Anthony J. Reinhart, Loudon, TN (US)

(73) Assignee: Radio Systems Corporation, Knoxville, TN (US)

( * ) Notice: Subject to any disclaimer, the term of this patent is extended or adjusted under 35 U.S.C. 154(b) by 433 days.

(21) Appl. No.: 15/493,190

(22) Filed: Apr. 21, 2017

(65) Prior Publication Data

US 2018/0303066 A1 Oct. 25, 2018

(51) Int. Cl.
| | | |
|---|---|---|
| *A01K 15/02* | (2006.01) |
| *B05B 12/12* | (2006.01) |
| *B65D 83/26* | (2006.01) |
| *A01K 27/00* | (2006.01) |
| *B05B 9/04* | (2006.01) |

(52) U.S. Cl.
CPC .......... *A01K 15/022* (2013.01); *A01K 27/001* (2013.01); *A01K 27/009* (2013.01); *B05B 9/0413* (2013.01); *B05B 12/12* (2013.01); *B05B 12/122* (2013.01); *B65D 83/262* (2013.01)

(58) Field of Classification Search
CPC .. A01K 15/022; A01K 15/021; A01K 15/023; A01K 27/009; A01K 27/007
See application file for complete search history.

(56) References Cited

U.S. PATENT DOCUMENTS

| | | | |
|---|---|---|---|
| 4,180,013 A | * | 12/1979 | Smith ................ A01K 15/022 119/718 |
| 4,627,385 A | | 12/1986 | Vinci |
| 4,893,580 A | | 1/1990 | Joseph et al. |
| 5,009,192 A | | 4/1991 | Burman |
| 5,214,411 A | | 5/1993 | Herbruck |
| 5,501,179 A | | 3/1996 | Cory |
| 5,559,498 A | | 9/1996 | Westrick et al. |
| 5,617,814 A | | 4/1997 | Bianco et al. |
| 5,640,932 A | | 6/1997 | Bianco et al. |
| 5,724,919 A | | 3/1998 | Boyd et al. |
| 5,785,004 A | | 7/1998 | Hobbs |

(Continued)

OTHER PUBLICATIONS

Petsafe Spray Commander Dog Training Collar printed from www.amazon.com on Nov. 27, 2015.

(Continued)

*Primary Examiner* — Jessica B Wong

(57) ABSTRACT

An animal behavior modification device is provided. The device includes a sound, vibration or motion sensor that is configured to generate electrical signals in response to an occurrence. The device may include a filter, which is tuned to recognize a dog barking event, and generate an electrical signal in response to recognizing an input signal indicative of a dog's bark. The device further includes a canister that holds a deterrent fluid under pressure. The device additionally comprises a motor module configured to rotate a shaft in response to the electrical signal from the filter. The canister has a spray nozzle for releasing fluid that affects the dog's senses. In response to rotating the shaft, the spray nozzle is depressed. A method of modifying the behavior of an animal using the device is also provided herein.

6 Claims, 12 Drawing Sheets

(56) References Cited

U.S. PATENT DOCUMENTS

| | | |
|---|---|---|
| 5,868,103 A | 2/1999 | Boyd |
| 5,911,198 A | 6/1999 | Curen et al. |
| 5,927,233 A | 7/1999 | Mainini et al. |
| 5,934,225 A | 8/1999 | Williams |
| 6,016,100 A | 1/2000 | Boyd et al. |
| 6,047,664 A | 4/2000 | Lyerly |
| 6,058,889 A | 5/2000 | Curen et al. |
| 6,158,392 A | 12/2000 | Andre et al. |
| 6,216,925 B1 | 4/2001 | Garon |
| 6,263,836 B1 | 7/2001 | Holllis |
| 6,327,998 B1 | 12/2001 | Andre et al. |
| 6,431,121 B1 | 8/2002 | Mainini et al. |
| 6,487,992 B1 | 12/2002 | Hollis |
| D475,941 S | 6/2003 | Williams |
| 6,588,376 B1 | 7/2003 | Groh |
| 6,604,490 B1 | 8/2003 | Lee, IV et al. |
| 6,651,592 B2 | 8/2003 | Maddox et al. |
| 6,668,760 B2 | 8/2003 | Groh et al. |
| 6,651,588 B1 | 11/2003 | Penzlmer |
| 6,782,847 B1 | 8/2004 | Shemesh |
| 6,820,571 B2 | 11/2004 | Cory |
| 7,017,524 B2 | 3/2006 | Gillis et al. |
| 7,021,244 B2 | 4/2006 | Boyd |
| 7,021,555 B2 | 4/2006 | Bagnall |
| D523,768 S | 6/2006 | Kaufman et al. |
| 7,111,586 B2 | 11/2006 | Lee et al. |
| D535,902 S | 1/2007 | Kaufman et al. |
| 7,174,856 B2 | 2/2007 | Neri |
| 7,222,589 B2 | 5/2007 | Lee, IV et al. |
| 7,249,572 B2 | 7/2007 | Goetzl |
| 7,267,081 B2 | 9/2007 | Steinbacher |
| 7,382,328 B2 | 6/2008 | Lee, IV et al. |
| 7,462,364 B2 | 12/2008 | Bell |
| 7,644,685 B2 | 1/2010 | Groh et al. |
| 7,658,166 B1 | 2/2010 | Rheinschmidt, Jr. et al. |
| 7,707,974 B2 | 5/2010 | Schrick |
| D622,454 S | 8/2010 | Levy et al. |
| 7,770,541 B2 | 8/2010 | Boyd |
| 7,834,769 B2 | 11/2010 | Hinkle et al. |
| 8,051,806 B2 | 1/2011 | Mushenski et al. |
| 7,900,585 B2 | 3/2011 | Lee, IV et al. |
| 7,913,653 B2 | 3/2011 | Jordan |
| 7,930,993 B2 | 4/2011 | Gross |
| 7,946,252 B2 | 5/2011 | Lee, IV et al. |
| 7,992,525 B1 | 8/2011 | Fisher |
| 7,996,983 B2 | 8/2011 | Lee, IV et al. |
| 8,011,327 B2 | 9/2011 | Mainini et al. |
| 8,037,848 B2 | 10/2011 | Mushenski et al. |
| 8,069,823 B2 | 12/2011 | Mainini et al. |
| 8,091,512 B2 | 1/2012 | So |
| 8,281,749 B2 | 10/2012 | Dukes |
| 8,342,134 B2 | 1/2013 | Lee, IV et al. |
| 8,438,999 B2 | 5/2013 | Hardi et al. |
| 8,714,113 B2 | 5/2014 | Lee, IV et al. |
| 8,736,499 B2 | 5/2014 | Goetzl et al. |
| 8,807,089 B2 | 8/2014 | Brown et al. |
| D714,498 S | 9/2014 | Khubani |
| 8,904,968 B1 | 12/2014 | Nelson |
| 8,947,240 B2 | 2/2015 | Mainini |
| D725,323 S | 3/2015 | Fang et al. |
| D725,324 S | 3/2015 | Schrick |
| 9,043,993 B1 | 6/2015 | James et al. |
| 9,185,884 B2 | 11/2015 | Herrmann |
| 9,398,756 B2 | 7/2016 | Eckert et al. |
| 2003/0136353 A1 | 7/2003 | Cory |
| 2003/0154929 A1 | 8/2003 | Groh et al. |
| 2004/0069204 A1 | 4/2004 | Smith |
| 2006/0076366 A1 | 4/2006 | Furner et al. |
| 2008/0156278 A1 | 7/2008 | Mainini et al. |
| 2011/0030622 A1 | 2/2011 | So |
| 2011/0139088 A1 | 6/2011 | Gordon |
| 2013/0264355 A1 | 10/2013 | Jodoin |
| 2015/0196010 A1 | 7/2015 | Orubor |
| 2015/0250143 A1 | 9/2015 | Klossner |
| 2017/0142932 A1 | 5/2017 | Mainini |
| 2017/0208775 A1 | 7/2017 | Van Curen et al. |

OTHER PUBLICATIONS

Elite Little Dog Spray Bark Collar printed from www.petsafe.net on Nov. 27, 2015.
Petsafe Elite Big Dog Spray Bark Collar printed from www.petsafe.net on Nov. 27, 2015.
Petsafe Gentle Spray Anti-Bark Collar printed from www.petsafe.net on Nov. 27, 2015.
Petsafe Ssscat Spray Deterrent printed from www.petsafe.net on Nov. 27, 2015.
Extended European Search Report for European Application No. EP18787534.9,dated Dec. 3, 2020, 11 pages.
International Search Report and Written Opinion for Application No. PCT/US2019/57449 dated Jan. 9, 2020, 11 pages.
International Search Report and Written Opinion for Application No. PCT/US2018/28547 dated Jul. 23, 2018, 17 pages.

* cited by examiner

PET SPRAY TRAINING SYSTEM

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field of the Invention

The present inventive concept relates to the field of pet training. More particularly, the invention relates to an improved portable spray device used as an aversive for animal behavior modification, such as controlling the barking of a pet dog.

Technology in the Field of the Invention

Many people who live in populated areas enjoy the companionship of dogs. Such individuals frequently live in apartment complexes, condominium complexes, garden home communities, zero lot line homes, lofts or high rise developments. In these instances, residents are living in close proximity to one another. Such close living arrangements may provide a feeling of community, may provide a convenient location for work, may provide affordable housing, may provide for a low-maintenance lifestyle, or may provide a lifestyle deemed to be vibrant or culturally stimulating.

At the same time, dog owners living in these circumstances face the challenge of controlling excessive or unwanted barking from a pet dog. In this respect, dogs have a habit of barking at strange noises, either as a protective habit or out of unwarranted fear or territorialism. Dogs also bark at other pets and at people. Such barking is a nuisance to neighbors living close by, and even to the dog owners themselves. This can produce conflicts between neighbors, and even litigation where barking is deemed to be an ongoing nuisance.

Various techniques have been developed to control the barking of a dog. First, barking can be controlled by the surgical removal of the larynx. However, this solution is usually unacceptable to pet owners as unnecessarily cruel and expensive. Second, standard obedience techniques can be used to train a dog not to bark, but this is time consuming and often requires the presence of the owner to correct the dog. If the owner is absent from the home for long periods of time, such as at work, the dog may learn to refrain from barking only when the owner is present, remaining a nuisance while the owner is away. Third, a muzzle can be utilized to prevent a dog from barking. However, the muzzle must be periodically removed to allow the dog to eat or drink which restores the need for supervision. Finally, remote and automatic systems using various trigger mechanisms (primarily electrical stimuli) have been developed to control the barking of a dog. However, not every pet owner wants to apply electrodes to the throat of a pet, particularly when the pet is small or frail.

One technique that has proved successful and that has been deemed particularly humane is the use of a spray canister. U.S. Pat. No. 4,627,385 entitled "Bark Restraining Device for Dogs" discloses a collar unit having an electronic circuit. The circuit includes a microphone with a filter, such as the filter shown in U.S. Pat. No. 8,714,113. Such a filter is sensitive to frequencies that correspond to those of the bark of a dog. When barking is sensed, the circuit actuates a valve that is associated with a pressurized tank of compressed gas or other fluid. When activated, the valve releases a spray of the fluid from a tank in the region of the head of the dog. The substance is designed to affect the senses of the dog, particularly the sense of smell. The '113 patent is incorporated herein by reference in its entirety.

In one aspect of the '385 patent, the electronic circuit is responsive to a signal from a remote transmitter carried by the pet owner or a trainer. The remote transmitter is shown in FIG. 7 of the '385 patent. The transmitter permits the owner or trainer to remotely actuate the release of the spray as part of the training of the dog. U.S. Pat. No. 4,627,385 is also incorporated herein by reference in its entirety.

Since the '385 patent issued in 1986, a variety of "spray trainers" have been placed on the market. Some spray trainers are associated with a dog collar, while others (typically directed towards cats) represent free-standing spray canisters equipped with motion sensors. In any of these instances, pressurized canisters having a solenoid release mechanism have been used. The canisters are filled in a "clean room," under pressure, at the factory before packaging for sale.

The currently-available collar-mounted, pressurized spray canisters utilize a refill valve, a separate spray valve and a solenoid releasing mechanism. These canisters can be difficult or complex to produce in high volume.

Accordingly, a need exists for an improved spray mechanism used for training pets that utilizes easily replaceable pressurized canisters. A need further exists for a spray training system that does not require a refillable tank or a pump mechanism for an unpressurized canister. Further, a need exists for a spray training mechanism that utilizes a small electrical motor that releases pressurized fluid rather than a pump that acts on an unpressurized container, which is prone to leakage.

BRIEF SUMMARY OF THE INVENTION

An animal behavior modification device is first provided herein. In one embodiment, the animal behavior modification device includes a sensor (such as a microphone). The sensor is configured to receive an input (such as sound frequencies), and to generate electrical signals in response.

The device also includes a filter. The filter is tuned to recognize input signals received by and emitted in proximity to the sensor. The filter is part of circuitry that generates an electrical behavior modification signal in response to recognizing signal input characteristic of the bark of a dog.

The device further includes a first canister. The first canister holds a bark deterrent fluid at positive pressure. Preferably, the bark deterrent fluid comprises a solution that stimulates one or more senses of a dog. For example, the solution may be sensed by the dog's sense of smell, hearing or touch. In one aspect, the stimulation is an offensive or "aversive" stimulation. In one aspect, the fluid is an irritant to a membrane of a dog.

The device additionally comprises a motor module. The motor module is configured to rotate a shaft for a designated period of time in response to conditioned electrical signals from the filter indicative of the bark of a dog.

In one embodiment, the device includes an elongated motor arm. In this embodiment, the device includes a gear operatively connected to the shaft and configured to move the elongated motor arm linearly in response to rotation of the shaft. Preferably, the gear is part of a gear assembly having at least two gears, and possibly three or four gears of progressive size, with one of the gears engaging the elongated motor arm. In this instance, the elongated motor arm will comprise teeth that mate with teeth of the engaging gear.

Still further, the device comprises a spray nozzle. The spray nozzle is associated with the first canister.

The device additionally includes an actuation arm. The actuation arm is pivotally connected to the elongated motor arm and is configured to depress the spray nozzle when the electrical motor is actuated to move the elongated motor arm in a first linear direction. This serves to release a short stream of bark deterrent fluid. The actuation arm is further configured to disengage the spray nozzle when the electrical motor remains actuated to move the motor arm in a second opposite linear direction, thereby closing off the release of bark deterrent fluid.

In another embodiment, the device include a cam. The cam defines a cam surface that acts on an actuation arm. In this embodiment, the device again includes a gear operatively connected to the shaft. However, in this instance the gear (or gear assembly) rotates the cam and associated cam surface in order to momentarily depress the spray nozzle. In this arrangement, continued actuation of the electrical motor causes the cam to continue rotating, which in turn cyclically depresses and releases the spray nozzle. Preferably, only one spray cycle is provided.

The device also comprises a battery. The battery is arranged to provide power to the electrical motor module and to any other electrical components, such as an optional wireless receiver or programmable logic controller.

Preferably, the animal behavior modification device also includes a housing. The housing is configured to hold at least the sensor, the filter, the motor module and the battery. The housing includes a connector, such as a slot or opposing loops, for connecting the housing to the collar of a dog.

In one embodiment, the housing includes a spray opening through which the deterrent fluid is emitted under pressure when the actuation arm engages the spray nozzle. In addition, the housing includes a slot for receiving the first canister. The spray nozzle aligns with the spray opening when the canister is placed in the slot. The housing may further comprise an access cover. The access cover is configured to expose the slot when the cover is pivotally opened. This enables removal and replacement of the first canister, as needed.

In one embodiment, the device communicates with a remote transmitter. The transmitter is configured to send a wireless bark deterrent signal in response to manual actuation, such as by a pet owner pushing a button. The device also includes a receiver located on the collar, such as on the housing. The receiver is configured to receive the bark deterrent signal wirelessly, and in response generate the electrical behavior modification signal. The electrical motor is configured to rotate the shaft for the designated period of time in response to the electrical behavioral modification signal from the receiver. This ultimately causes a stream of the bark deterrent fluid to be released through the spray nozzle. In this way, the device can also be remotely operated by a pet owner.

In another embodiment, the device is part of a system that includes a remote transmitter that is part of a stationary unit. The transmitter is configured to send a wireless bark deterrent signal to the receiver on the collar in response to on-board bark sensing and filtering electronics on a stationary bark-sensing and transmitting device. The device also includes a receiver co-located on the collar or otherwise along the housing. The receiver is configured to receive the bark deterrent signal as transmitted by the remote, stationary bark-sensing device, and in response, generate an electrical behavior modification signal. The electrical motor is configured to rotate the shaft and ultimately cause the actuation arm to engage the spray nozzle of the first canister in response to the electrical behavior modification signal delivered by the receiver (or related processor). Ultimately, this causes a stream of the bark deterrent fluid to be released through the spray nozzle along the collar. In this way, the device can discourage barking in a designated location such as a nursery.

In yet another embodiment, the device is generally free-standing, that is, no portion resides along a collar, and includes a sensor, a filter, an electric motor module and a fluid canister. The sensor and filter are configured to receive input signals (such as sound frequencies) and to generate electrical signals in response to recognizing input signals characteristic of the bark of a dog. The electrical motor module is configured to cause fluid to be emitted from the canister in response to the electrical signal from the sensor/filter, and to cause a stream of fluid to be released upon the recognition of a bark. In this way, the device is free-standing and can be moved to a room to discourage barking in the room where the bark deterrent device is located.

In yet another embodiment, the system is again free-standing and portable, but this time includes a motion sensor along with the filter, electric motor module and the fluid canister. The motion sensor is configured to receive motion signals and to generate electrical signals in response to sensing motion characteristic of the movement of a pet. The electrical motor is configured to rotate a gear in response to the electrical signal from the motion sensor, and to ultimately cause a stream of deterrent fluid to be released upon the recognition of pet movement in an area. In this way, the device can discourage the presence of a pet in a designated location where the system is placed, such as a kitchen or nursery or office.

In still another embodiment, the device comprises a second canister containing a behavior reinforcement fluid, wherein the behavior reinforcement fluid comprises a solution that is pleasing to a dog's sense of smell to provide positive reinforcement. A remote transmitter is again offered, which is configured to send a behavior reinforcement signal in response to manual actuation to a receiver. The receiver is located along a collar, such as within a housing. The electrical motor is configured to rotate a shaft, which causes a spray nozzle to be depressed, which then causes fluid from the second canister to be released in response to the electrical behavior modification signal from the receiver.

In another embodiment, the device further comprises a tone generation element that can be used independently or in concert with either the deterrent fluid or the reinforcement fluid. The generated tone may be a deterrent tone or a reinforcement tone, used with the deterrent fluid or the reinforcement fluid, respectively. Alternatively, the device further comprises a vibratory element such as a micro-motor that delivers vibration to the dog as a deterrent signal.

A method for modifying the behavior of an animal is also provided herein. The method employs the animal behavior modification devices described above, in any of their various embodiments.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

FIG. 6 shows a remote transmitter that communicates with the device via manually actuated wireless signals.

FIG. 7 shows a remote stationary receiver that communicates with the device via wireless signals.

FIG. 8 shows a remote stationary system with a microphone that senses the barking of a dog.

FIG. 9 shows a remote stationary system with a motion detecting sensor and a spray canister.

FIG. 10 also shows a stationary system with a motion detecting sensor. Here, the spray canister is associated with a dog collar.

DETAILED DESCRIPTION OF CERTAIN EMBODIMENTS

Definitions

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below.

Description of Selected Specific Embodiments

Figure 1:
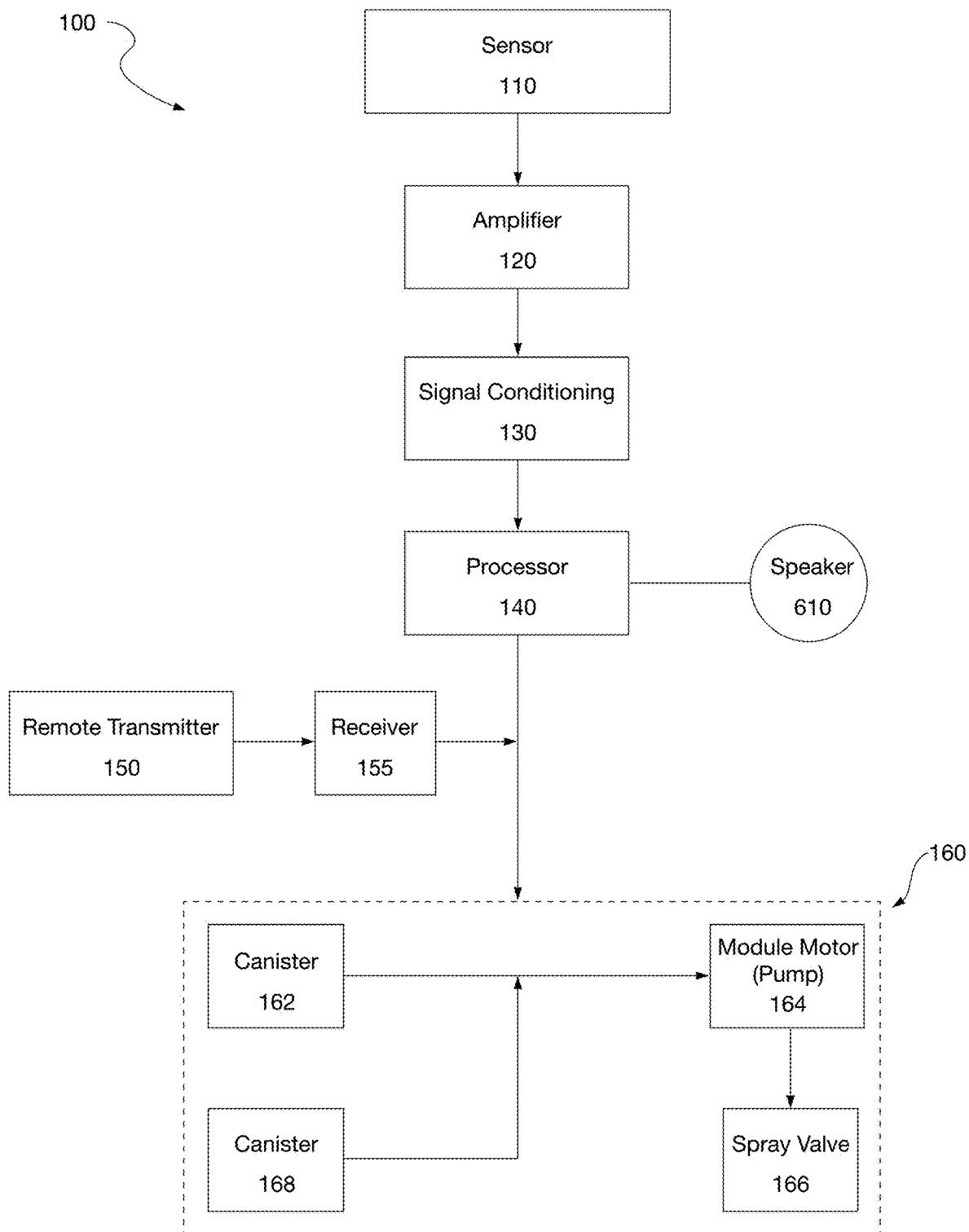
FIG. 1 is a schematic view of the animal behavior modification device of the present invention, in one embodiment.

FIG. 1 is a schematic view of an animal behavior modification system or device 100 of the present invention, in one embodiment. A plurality of components for the device 100 are shown. In some embodiments, the components are intended to reside on the collar of a dog. An illustrative collar is shown at 600 in FIG. 6, placed around a pet 650. It is understood that the term "collar" may include a harness or other similar device.

Referring back to FIG. 1, the device 100 first includes a sensor 110. The sensor 110 may be any device that is responsive to the bark of the dog. In one embodiment, the sensor 110 is a piezoelectric vibration sensor that is in contact with the dog for measuring vibrations produced by the dog. The piezoelectric sensor is a low current device used for detecting the barking of a dog. In one aspect, the sensor 110 is placed in contact with the throat of the dog so as to measure vibrations produced by the vocal cords of the dog. Such an embodiment is described in detail in U.S. Pat. No. 6,668,760 entitled "Spray Control Anti-Bark Collar," the entirety of which is incorporated herein by reference in its entirety.

In a more preferred embodiment, the sensor 110 is a microphone. The microphone 110 is configured to receive sound frequencies emitted in proximity to the dog collar. In response, the microphone 110 generates electrical signals.

The electrical signals from the microphone 110 are taken through a conditioning process. In one aspect, this includes amplification. Thus, the animal behavior modification device 100 may also include an amplifier 120. The amplifier 120 is coupled to the sensor 110 and amplifies the electrical signal output of the vibration (or sound) sensor 110 to increase the level of the sensor output for further processing and more accurate sampling.

The animal behavior modification device 100 optionally includes a circuit 130 for further signal conditioning of the electrical signal output of the amplifier 120. The signal conditioning circuit 130 serves to discriminate among the vibrations or sound frequencies measured by the sensor 110 so as to pass only measured vibrations or frequencies that meet specified criteria. For example, the signal conditioning circuit 130 may be configured to filter out frequencies not indicative of the bark of a dog, or to pass only those vibrations signals occurring within a specified frequency range or those meeting certain durational limits. The signal conditioning circuit 130 may be configured to eliminate unwanted output electrical signals from the sensor 110 output. Those skilled in the art will recognize the various filters, amplifiers and other signal conditioning devices that can be used to prepare the measured frequencies or vibrations for further processing. Those skilled in the art will also recognize that the type of signal conditioning depends upon the input signal, the corresponding sensor and the desired characteristics of the input signal that are to be monitored. For example, the signal conditioning or filter may be active or passive and may be set to pass a specific frequency range or to remove high or low frequency noise. Further, depending upon the various components used, the output signal may not require additional amplification. Finally, other conditioning may be required to present a useable sensor output to the remainder of the circuit.

As part of the filtering process, a controller or processor 140 monitors the amplified output and activates a stimulus delivery mechanism 160. In the present invention, the stimulus delivery mechanism 160 is a so-called spray trainer. Decision-making logic within the processor 140 determines whether a spray is needed through the actuation of the stimulus delivery mechanism 160. Typically, the input to the processor 140 is compared against a reference value to determine whether a spray-type stimulus is warranted. A conventional processing device 140 includes an internal timer, memory registers and math capabilities allowing sophisticated signal processing to occur; however, those skilled in the art will recognize that these capabilities can be achieved using other components without departing from the spirit and scope of the present invention, such as through firmware. Further, those skilled in the art will recognize that the electrical components used depend on various factors including the cost of manufacture, size and weight constraints and the complexity of the decision process. For example, the size and weight of the training collar worn by the animal is reduced by implementing the controller in a single application specific integrated circuit (ASIC) or a microprocessor, both of which allow complex decision making capabilities. For lower cost, larger units implementing a simple decision tree, or an array of discrete logic components can be used.

In the illustrated embodiment for the animal behavior modification device 100, the stimulus delivery mechanism 160 is a spray mechanism that delivers a controlled dose of a bark deterrent substance or fluid. The spray delivery mechanism 160 includes a first canister (or cartridge, or tank) 162, a motor module 164 and a depressible spray valve or nozzle 166. The bark deterrent substance is held within the canister 162 under pressure, and represents a solution that affects the olfactory (or other) senses of the dog.

The deterrent substance is selected to be irritating or disturbing to the dog. A commonly used deterrent stimulus is a citronella liquid; however, those skilled in the art will recognize other deterrent substances that can be used without departing from the scope and spirit of the present invention, for example compressed air or water. In addition, those skilled in the art will recognize that the sound of the substance escaping under pressure provides a secondary deterrent function. Thus, in one aspect the animal behavior modification device 100 also includes a speaker 610. The speaker 610 is associated with the processor 140, and is configured to emit a sound that emulates a spray of fluid in response to conditioned electrical signals from the filter indicative of the bark of a dog. This is particularly useful if the canister 162 becomes depleted of fluid. Alternatively, a micro-motor is provided as element 610, which vibrates in response to receiving an actuation signal.

Figure 2A:
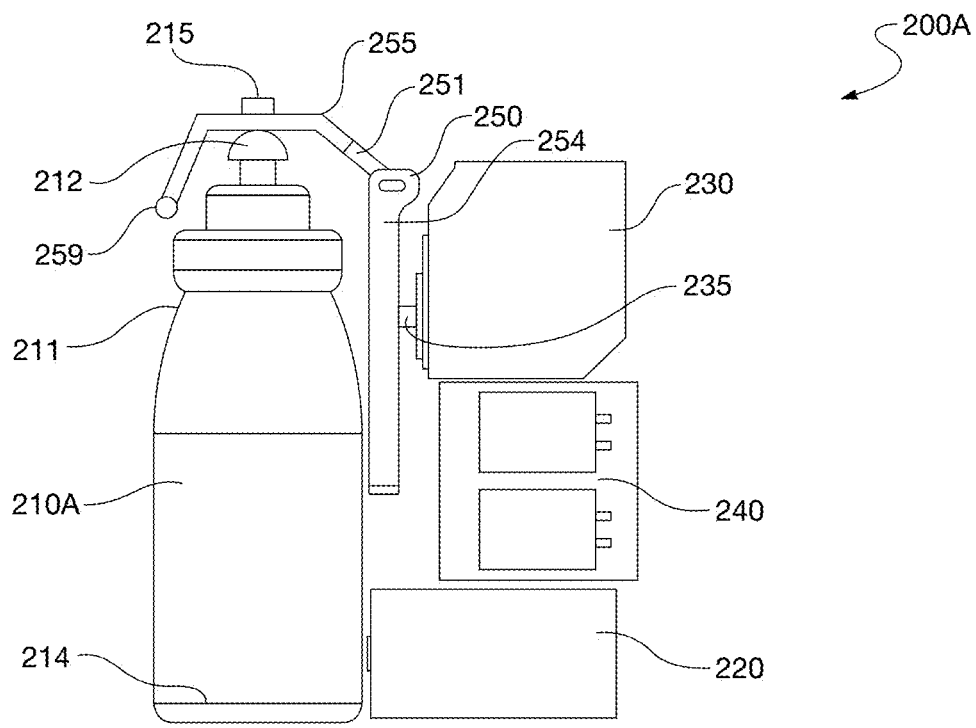
FIG. 2A is a schematic view of a single stroke pet spray device that utilizes an electric motor module to turn a shaft, in one embodiment. Rotation of the shaft ultimately causes a spray nozzle associated with a canister to be depressed, thereby releasing a spray of behavior modification fluid. In this view, a canister having a cylindrical configuration is used.

FIG. 2A is a schematic view of a single-stroke pet spray device 200A, in one embodiment. The pet spray device 200A includes a pressurized canister 210A. In this arrangement, the canister 210A has a cylindrical configuration and sealingly holds a behavior modification fluid such as a bark deterrent fluid.

The canister 210A has an upper end 211 and a lower end 214. The upper end 211 comprises a bell-shaped shoulder 212 fixedly connected to a spray nozzle 215. When the shoulder 212 is depressed, the bark deterrent fluid is released as a spray or mist from the canister 210A through the spray nozzle 215.

The pet spray device 200A also includes electrical circuitry, shown schematically as printed circuit board 220. The circuitry/board 220 includes the sensor 110, the amplifier 120, the signal conditioning 130 and the processor 140 of FIG. 1. The circuitry 220 may also, in some embodiments described further below, include a receiver. The receiver, shown in FIG. 1 at 155, is designed to receive an external actuation signal.

The pet spray device 200A utilizes an electrical motor module 230. The motor module 230 receives an electrical behavior modification signal from the circuitry 220 when a sound indicative of the bark of a dog is picked up or sensed. This causes the motor module 230 to rotate a shaft 235, which is mechanically engaged with a gear assembly (seen best at 260 in FIG. 4A). The gear assembly 260 will include at least one gear configured to engage an elongated motor arm 250. The motor arm 250 may be a rack portion of a rack and pinion type arrangement, which moves linearly while being driven by the turning of the gear for a designated period of time.

The pet spray device 200A also includes an actuation arm 255, as seen in FIG. 2A. The actuation arm 255 has a proximal end 251 and a distal end 259. The proximal end 251 is pivotally connected to an upper end of the motor arm 250 while the distal end 259 is pivotally connected to a housing (seen at 300 in FIGS. 4A and 4C). The actuation arm 255 is connected to or otherwise passes along the shoulder 212 at the spray nozzle 215.

The pet spray device 200A further includes one or more batteries 240. The batteries 240 are configured to supply electrical power to the components of the circuitry 220 and to the electric motor module 230. In one aspect, the circuitry 220 includes a timer that controls the length of time the motor module 230 is actuated to turn the shaft 235.

In operation, a signal is sent from the electrical circuitry 220 to the electric motor module 230. The signal may be sent in response to a condition being sensed by a sensor 110. In one aspect, the sensor 110 is an on-board microphone that detects the barking of the dog. In another aspect, the sensor is a microphone located in a separate (or remote) sensing unit. In still another aspect, the condition is the sensed motion of a dog detected in a room that is considered off-limits to the dog. In this latter arrangement, the motion detector is again a separate (or remote) sensing unit. The remote sensing unit has a transmitter that sends an actuation signal as discussed more fully below in connection with FIGS. 8, 9 and 10.

In any instance, upon receipt of the actuation signal, the motor module 230 is activated for a designated period of time according to the timer of the electrical circuitry 220. Activation of the motor module 230 rotates the shaft 235, which in turn rotates one or more gears in a gear assembly 260. An ultimate gear (shown in FIG. 4B at 262) engages the elongated motor arm 250, causing the motor arm 250 to move linearly. In the arrangement of FIG. 2A, the motor arm 250 is caused to move down relative to the spray nozzle 215 upon the sensing of a bark by the sensor 110 and the resulting electronic signal sent to and processed by the processor 140.

As noted, the upper end 254 of the elongated motor arm 250 is pivotally connected to the proximal end 251 of the actuation arm 255. Movement of the motor arm 250 downwardly causes the actuation arm 255 to engage the shoulder 212 at the spray nozzle 215, causing the spray nozzle 215 to also move downwardly with respect to the canister 210A. This, in turn, releases a spray of the pressurized bark deterrent (or other behavior modification) fluid from the nozzle 215. Thus, rotation of the shaft 235 ultimately causes the spray nozzle 215 associated with the canister 210A to be depressed, releasing a spray of behavior modification fluid under pressure.

Figure 2B:
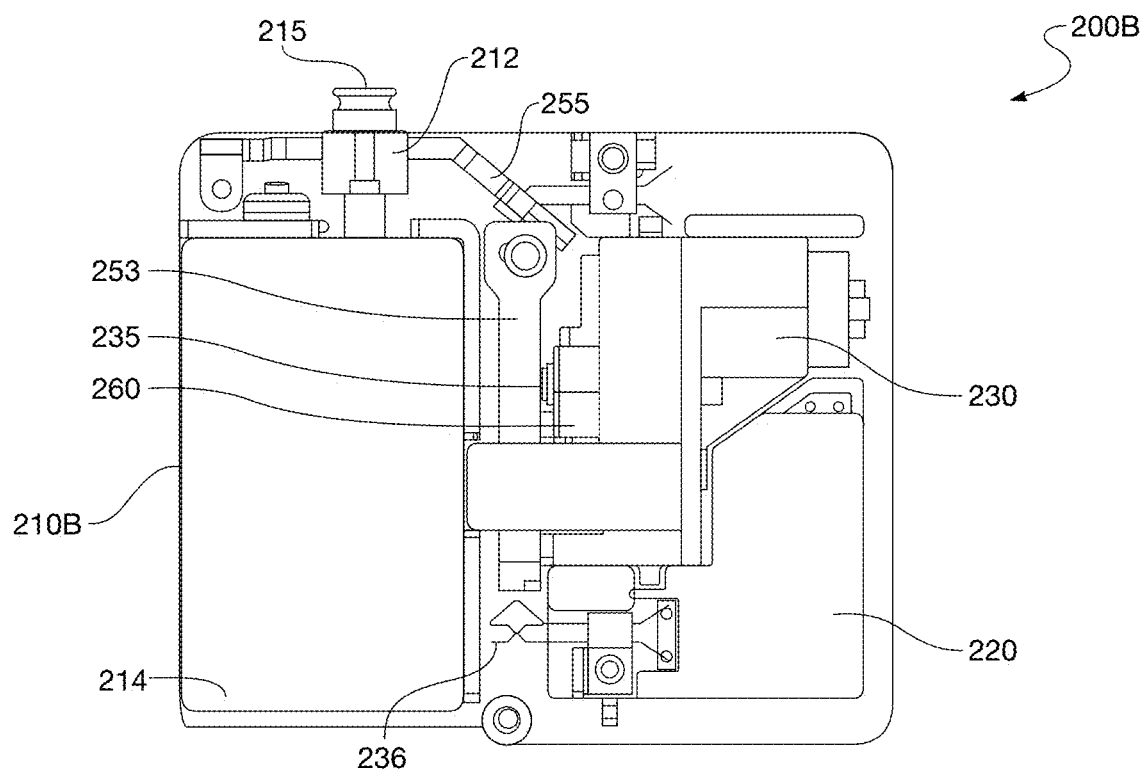
FIG. 2B is another schematic view of a single stroke pet spray device that utilizes an electrical motor module to turn a shaft, in a second embodiment. Rotation of the shaft again ultimately causes a spray nozzle associated with a canister to be depressed, thereby releasing a spray of behavior modification fluid. In this view, the canister has a rectangular prism configuration.

FIG. 2B is a cross-sectional schematic view of another single-stroke pet spray device 200B that utilizes an electrical motor module 230 to turn a shaft 235. The device 200B works in accordance with the device 200A of FIG. 2A. In this respect, a sensor 110 is used to detect a condition such as the barking of a dog or the movement of a dog. Upon sensing, an actuation signal is sent to cause the motor module 230 to rotate the shaft 235. This ultimately causes the spray nozzle 215 associated with a canister 210B to be depressed, releasing a spray of behavior modification fluid under pressure.

In the arrangement of FIG. 2B, the canister 210B has a rectangular prism configuration. For pricing advantage, the canister 210B may be a modified cigarette lighter housing. Of course, the pressurized fluid inside the canister 210B would be a behavior modification fluid such as a bark deterrent fluid and not so-called lighter fluid.

Figure 3A:
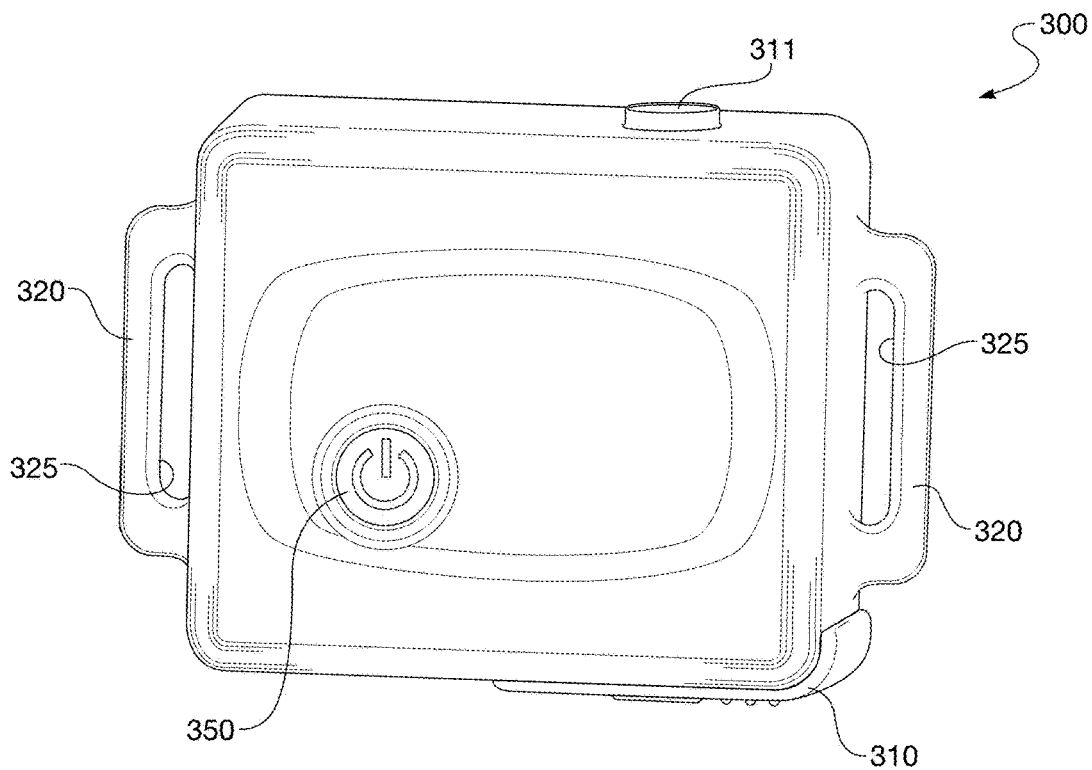
FIG. 3A is a perspective view of an illustrative housing as may be used to hold the devices of either FIG. 2A or FIG. 2B.

FIG. 3A is a perspective view of an illustrative housing 300 as may be used to hold the device 200A or 200B of FIG. 2A or FIG. 2B, respectively. The housing 300 is preferably fabricated from a light-weight but durable polycarbonate material. The housing 300 includes a front panel 310 that in one aspect is removable, such as through a clamshell or snap-on/snap-off arrangement or screws. The housing 300 may offer a power button 350 that enables the pet owner to turn the pet spray device 200A or 200B on and off. The housing 300 also includes an opening 311 along an edge which is aligned with the nozzle to allow the spray from the nozzle 215 through the opening 311 upon actuation of the device.

The housing arrangement 300 of FIG. 3A is designed to be attached to a collar (such as collar 600 shown in FIGS. 6, 7 and 10) of a pet dog 650. To this end, the illustrative housing 300 offers opposing loops 320 with respective through-openings 325. The through-openings 325 are dimensioned to receive the collar 600 to secure the housing 300 and pet spray device (200A or 200B) to the animal. It is understood that for purposes of the present disclosure, a collar includes a harness of any type.

Figure 3B:
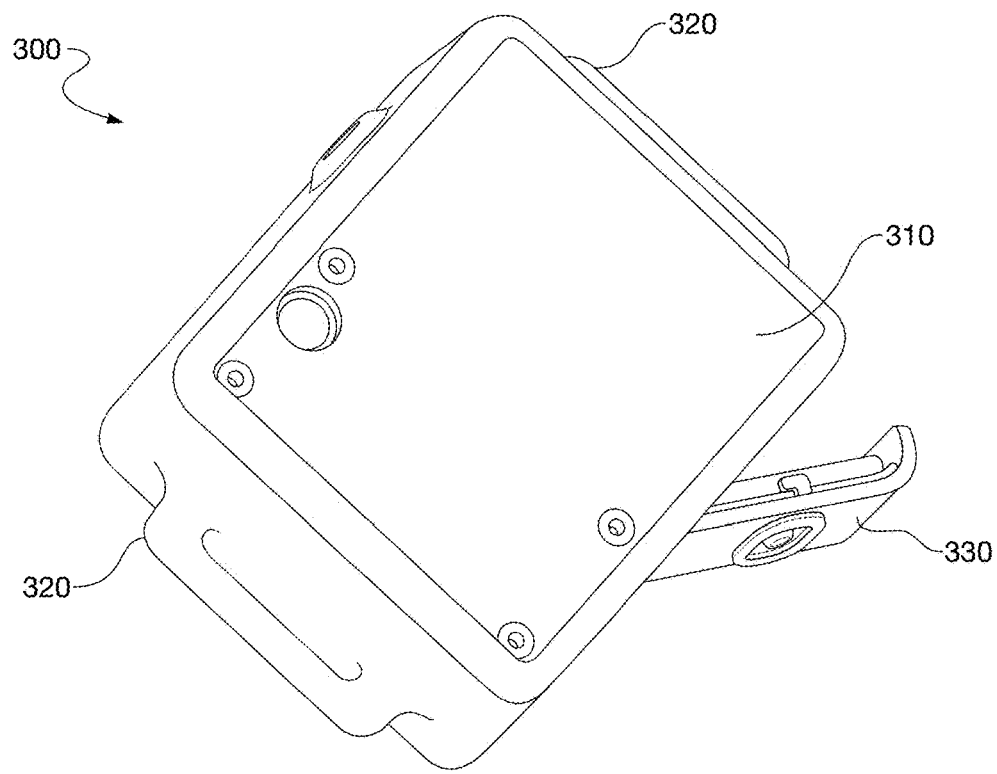
FIG. 3B is a perspective view of the housing of FIG. 3A, wherein an access cover is opened. In addition, a portion of the front panel of the housing has been lifted off.

FIG. 3B is a perspective view of the housing 300 of FIG. 3A, wherein an access cover 330 is opened. In addition, a portion of the front panel 310 of the housing 300 has been lifted off.

Figure 3C:
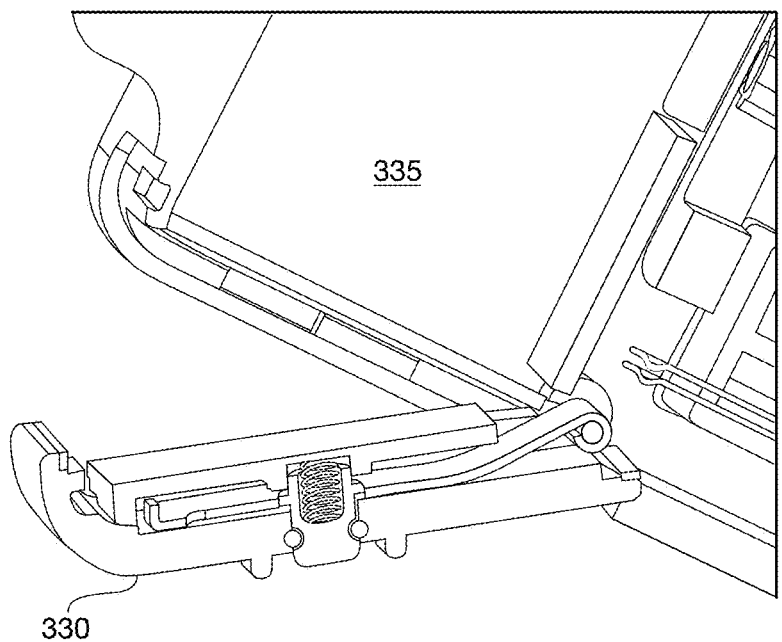
FIG. 3C is an enlarged perspective view of a portion of the housing of FIG. 3A. In this view, an access cover is shown in an opened position.

FIG. 3C is an enlarged perspective view of the housing 300 of FIG. 3A. In this view, the access cover 330 of the housing 300 remains open, revealing the canister slot 335. In addition, screws (not shown) have been loosened to partially remove or lift off a portion of the front panel 310.

Figure 4A:
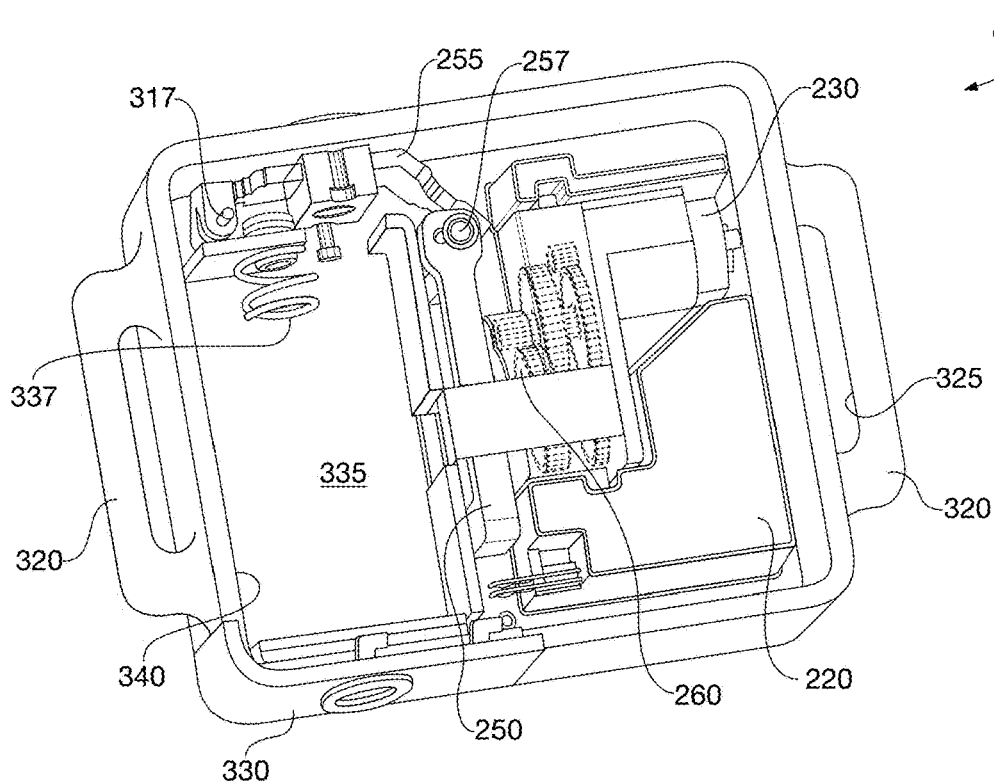
FIG. 4A is a perspective view of the housing of FIG. 3A, wherein a front panel has been removed to expose a pet spray training system of the present invention, in a first embodiment. The system includes an electric motor module, a gear assembly, an elongated motor arm and an actuation arm. The canister has been removed from the slot and is not visible.

FIG. 4A is a perspective view of the interior of the housing 300 of FIG. 3A. In this view, the front panel 310 has been completely removed to expose internal components of the pet spray device 200B. These components include an electric motor module 230, a gear assembly 260, an elongated motor arm 250 and an actuation arm 255. The canister 210B has been removed and is not visible. It is further observed in FIG. 4A that the access cover 330 is closed covering a canister slot 335.

Of interest from the view of FIG. 4A, a linking pin 257 is visible. As explained more fully in connection with FIG. 4C, the linking pin 257 enables a pivoting connection between the upper end 254 of the elongated motor arm 250 and the proximal end 251 of the actuation arm 255. At the same time, the distal end 259 of the actuation arm 255 is pinned to the housing 300 through pin 317.

The gear assembly 260 may include more than one gear, at least in this arrangement. Thus, rotation of the shaft 235 causes a progression of engaged gears to turn, ultimately moving the elongated motor arm 250 to move linearly.

Figure 4C:
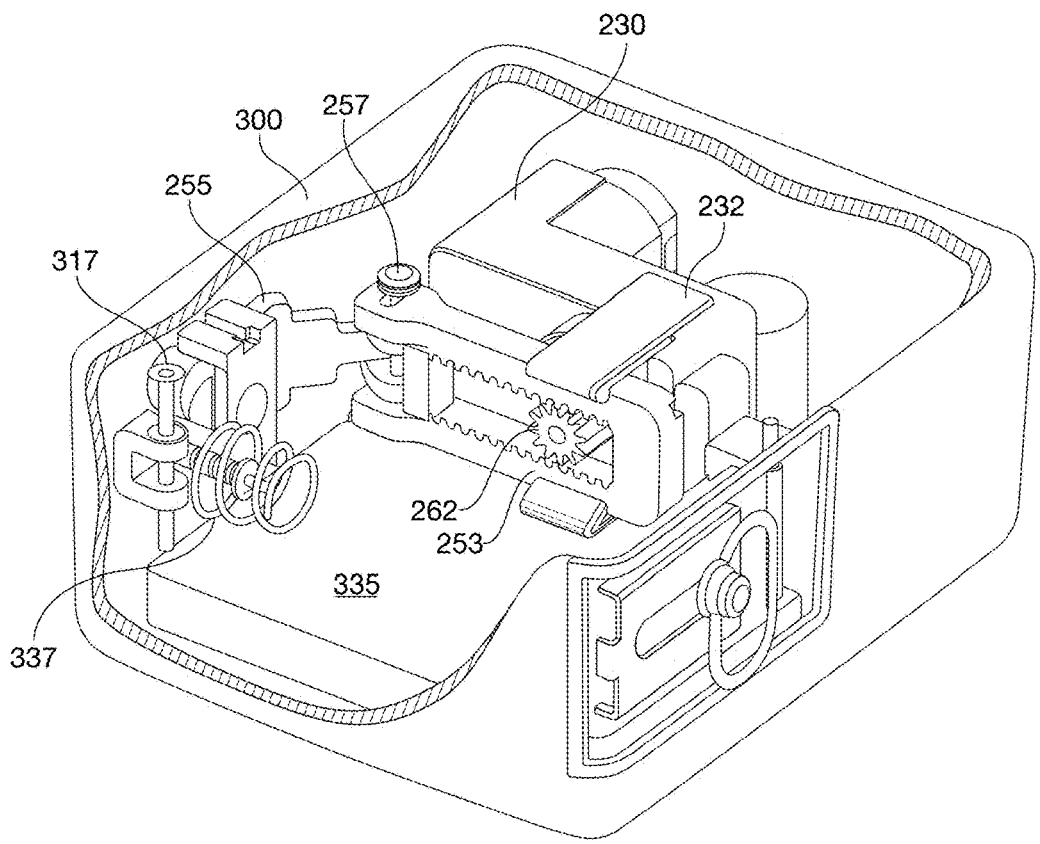
FIG. 4C is another perspective view of the housing of FIG. 3A. Here, the housing is cut-away, exposing the pet spray training system of FIGS. 4A and 4B.
Figure 4B:
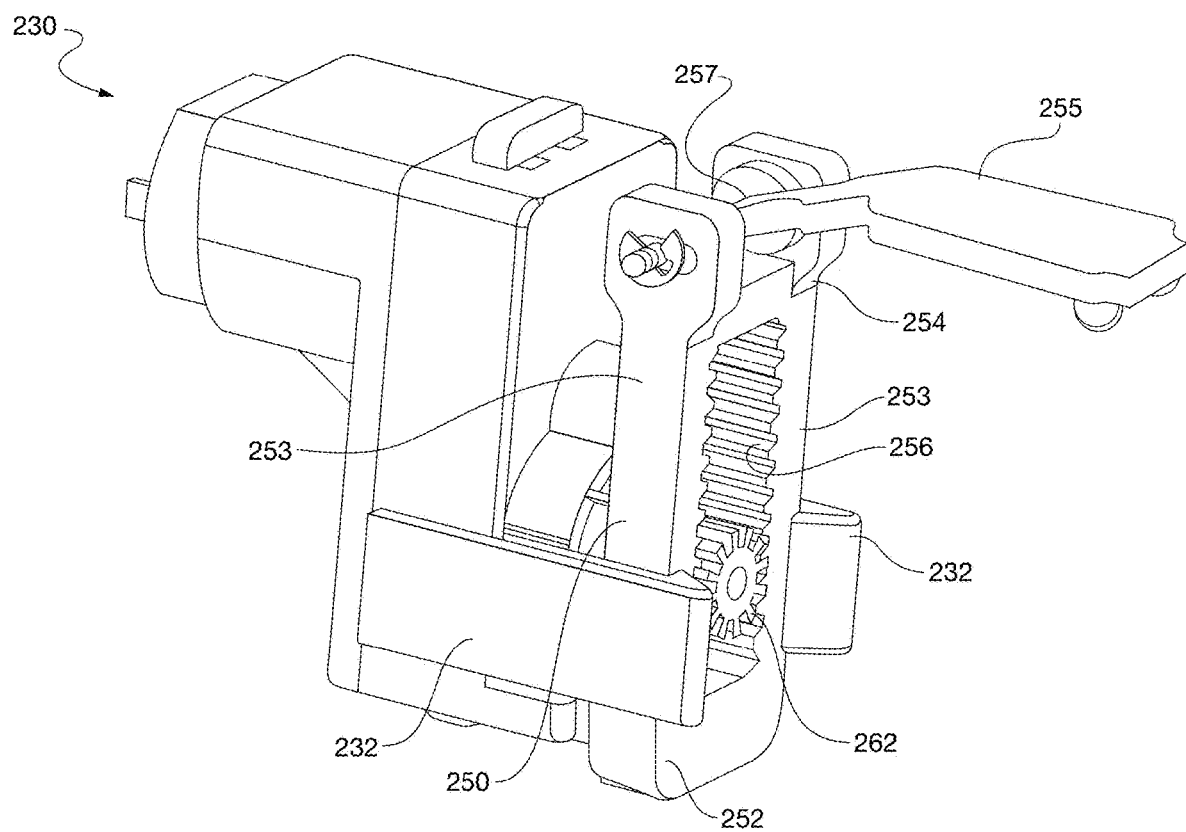
FIG. 4B is an enlarged perspective view of the electric motor module of the pet spray training system of FIG. 4A, in one embodiment. The electric motor module, elongated motor arm and gear assembly are visible as well.

FIG. 4B is an enlarged perspective view of the electric motor module 230 of the pet spray training system 300 of FIG. 4A, in one embodiment. The motor arm 250 is visible along with the last gear 262. The gear 262 engages the elongated motor arm 250. The motor arm 250 is held in place relative to the motor module 230 by means of opposing clips 232. The clips 232 secure the arm 250 laterally, but permit linear movement in the up and down directions depending on rotational direction of the shaft 235 and gear 262. Alternatively, continued rotation of the gear 262 in the same angular direction will cause the linear direction of movement of the elongated motor arm 250 to reverse in accordance with operation of a rack-and-pinion assembly.

It is noted that in this arrangement, the elongated motor arm 250 comprises two opposing legs 253. The legs 253 come together to form the lower end 252 and the upper end 254 of the arm 250. The linking pin 257 is seen at the upper end 254 of each leg 253. It is further observed that internal surfaces of the legs 253 have gear surfaces 256. The gear surfaces 256 define teeth that receive the engaging gear 262 of the gear assembly 260. As such, the gear arrangement or assembly including the motor arm 250 is of a rack and pinion type arrangement.

FIG. 4C provides an enlarged perspective view of the housing of FIG. 4A. Here, the housing 300 is cut-away, exposing parts of the pet spray training system 200B of FIG. 2B. The spring 337 is seen positioned within the canister slot 335. The spring is configured to apply a biasing force upon the canister 210B to maintain its proper position and to insure proper actuation of the actuation arm 255 upon the nozzle 215.

The pet spray training system 200B relies upon an elongated pivoting actuation arm 255 that is momentarily pulled downward by the motor arm 250. This pulling action momentarily depresses the nozzle 212 (seen in FIG. 2B) associated with the canister 210B. The motor arm 250, in turn, is driven linearly (up and down) by a rack-and-pinion type arrangement driven by gears 260 (seen best in FIG. 4A). When the motor arm 250 travels downward, the actuation arm 255 pivots downward upon the nozzle 212, causing behavior modification fluid under pressure within the canister 210B to be expelled through the opening 311. When the motor arm 250 returns to its upward position, the actuation arm 255 pivots back upward, thereby releasing the nozzle 212 and shutting off the pressurized release of fluid.

It is observed that the same result, that is, momentary depression of the nozzle 212, may be accomplished by substituting the motor arm 250 and the actuation arm 255 with a rotating cam. In this embodiment, the rotating cam has a sinusoidal surface that acts against a transverse actuation arm. Thus, a rotational movement generated by a shaft again produces a linear movement that acts upon the nozzle 212.

Figure 5A:
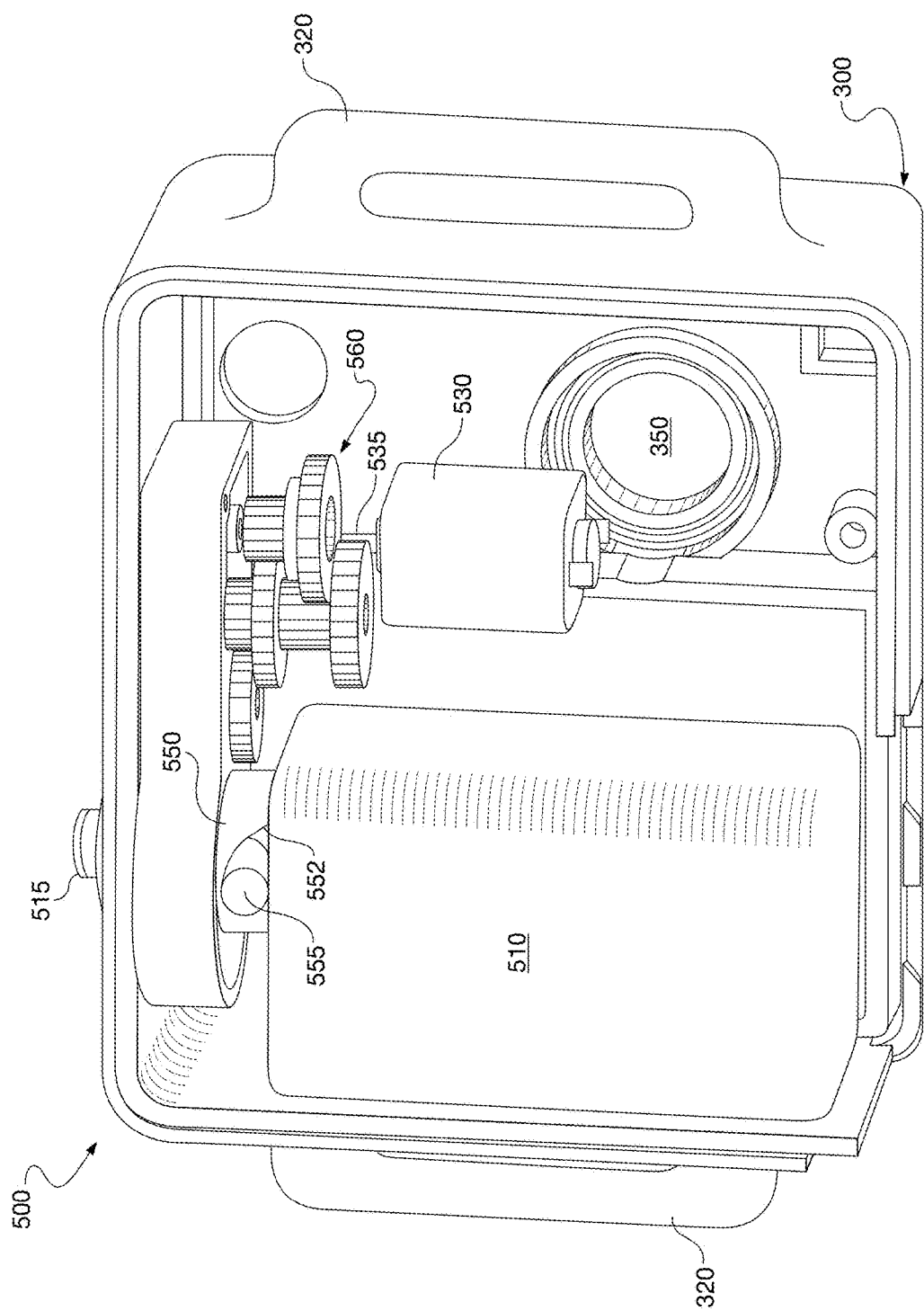
FIG. 5A is a perspective view of the housing of FIG. 3A, wherein a front panel has again been removed to expose a pet spray training system of the present invention, but in a second embodiment. The system includes an electric motor module, a gear assembly, a cam and an actuation arm. A canister is also visible here.
Figure 5B:
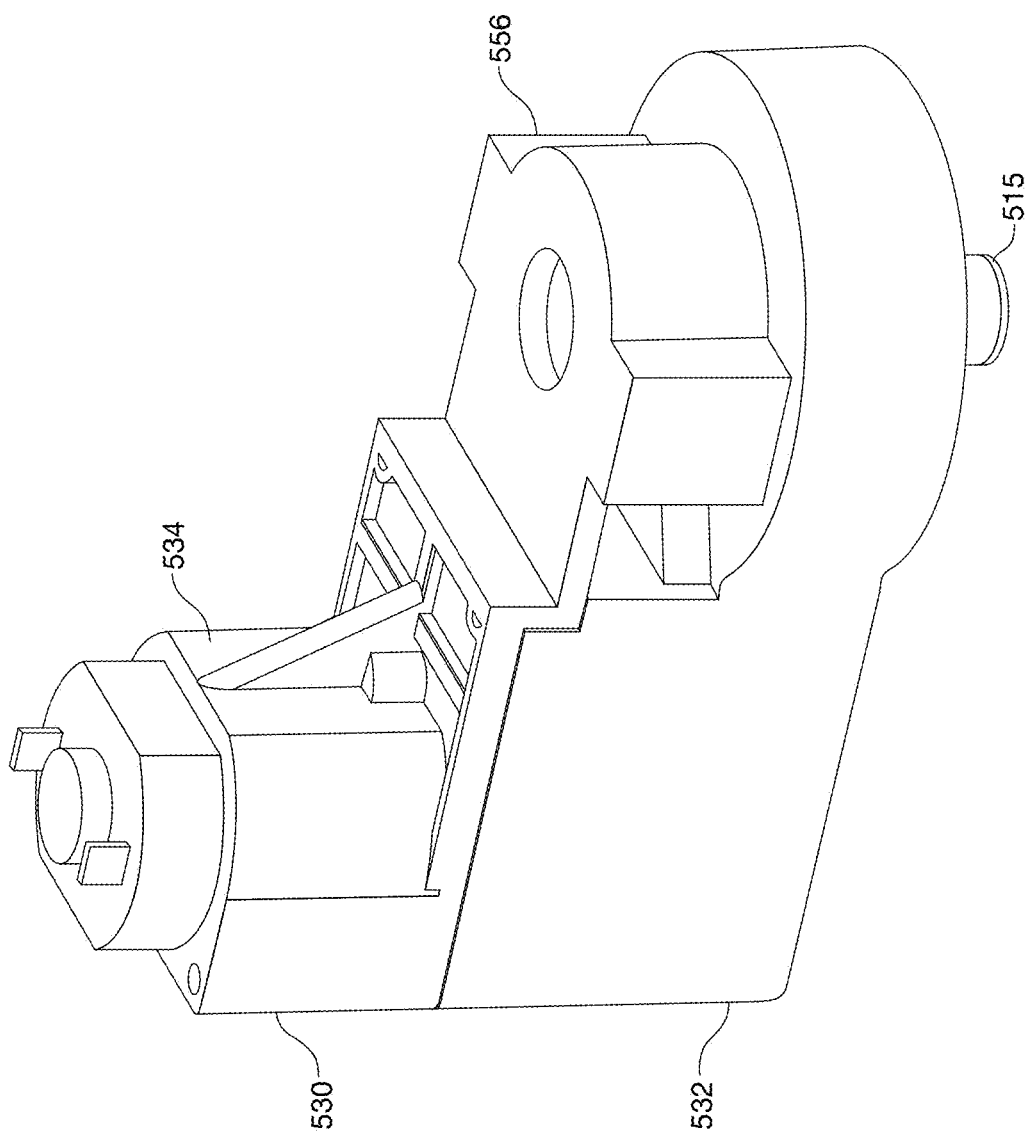
FIG. 5B is an enlarged perspective view of the electric motor module of FIG. 5A.
Figure 5C:
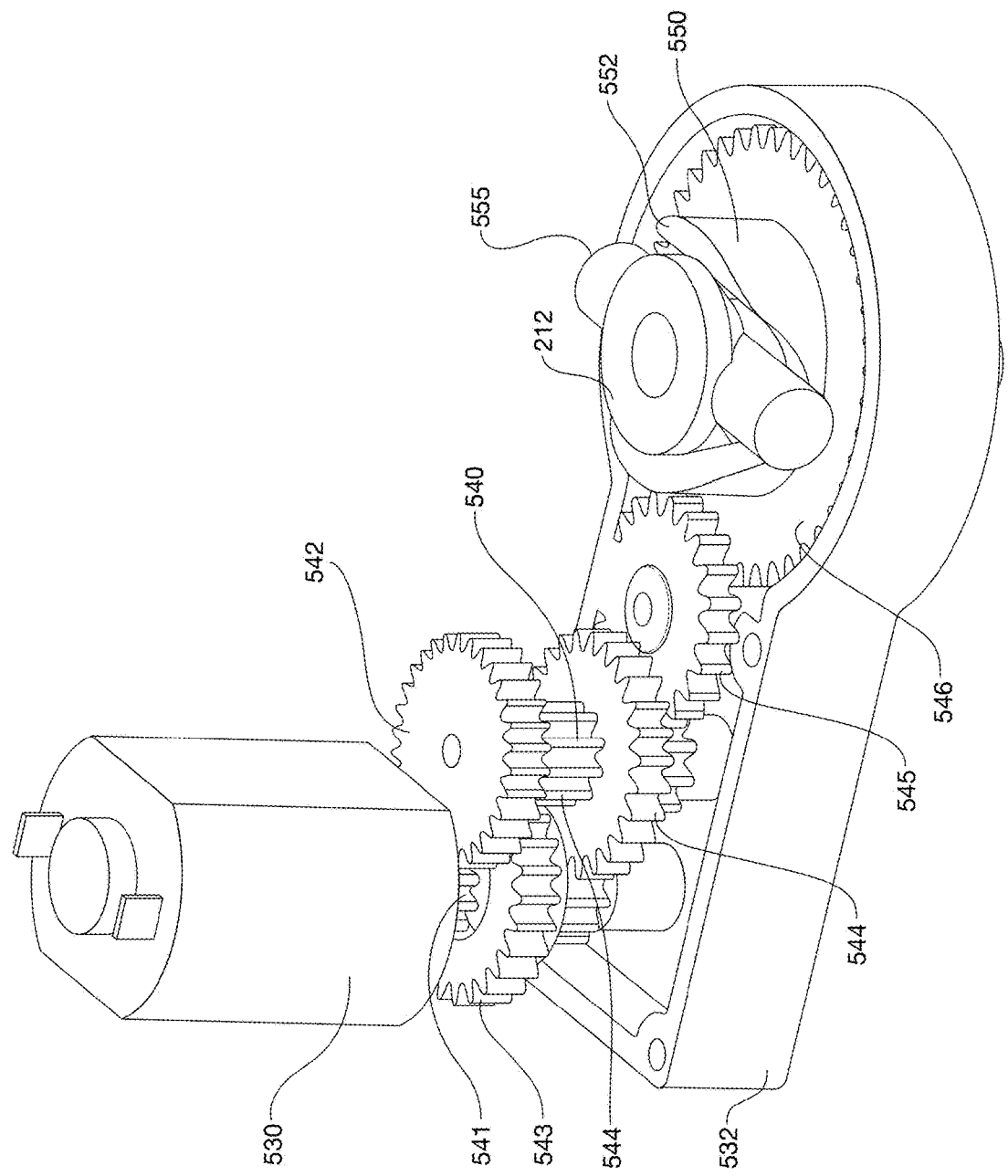
FIG. 5C is another enlarged perspective view of the electric motor module of FIG. 5A. Here, a portion of the housing of the module is removed, exposing the internal gears of the gear assembly.

FIGS. 5A through 5C present a pet spray training system (or an animal behavior modification device 500) in this alternate embodiment. In this respect, a cam 550 is provided having a cam surface 552. In addition, a transverse actuation arm 555 is employed to act against a spray nozzle 515.

FIG. 5A is a perspective view of the housing 300 of FIG. 3A, wherein a front panel 310 has again been removed. The pet spray training system 500 (as an animal behavior modification device) is seen therein. Visible in FIG. 5A is an electric motor module 530. The electric motor module 530 operates off of battery power to drive a shaft 535. The electric motor module includes a gear housing (seen at 532 in FIG. 5B) and a motor housing 534.

Figure 5D:
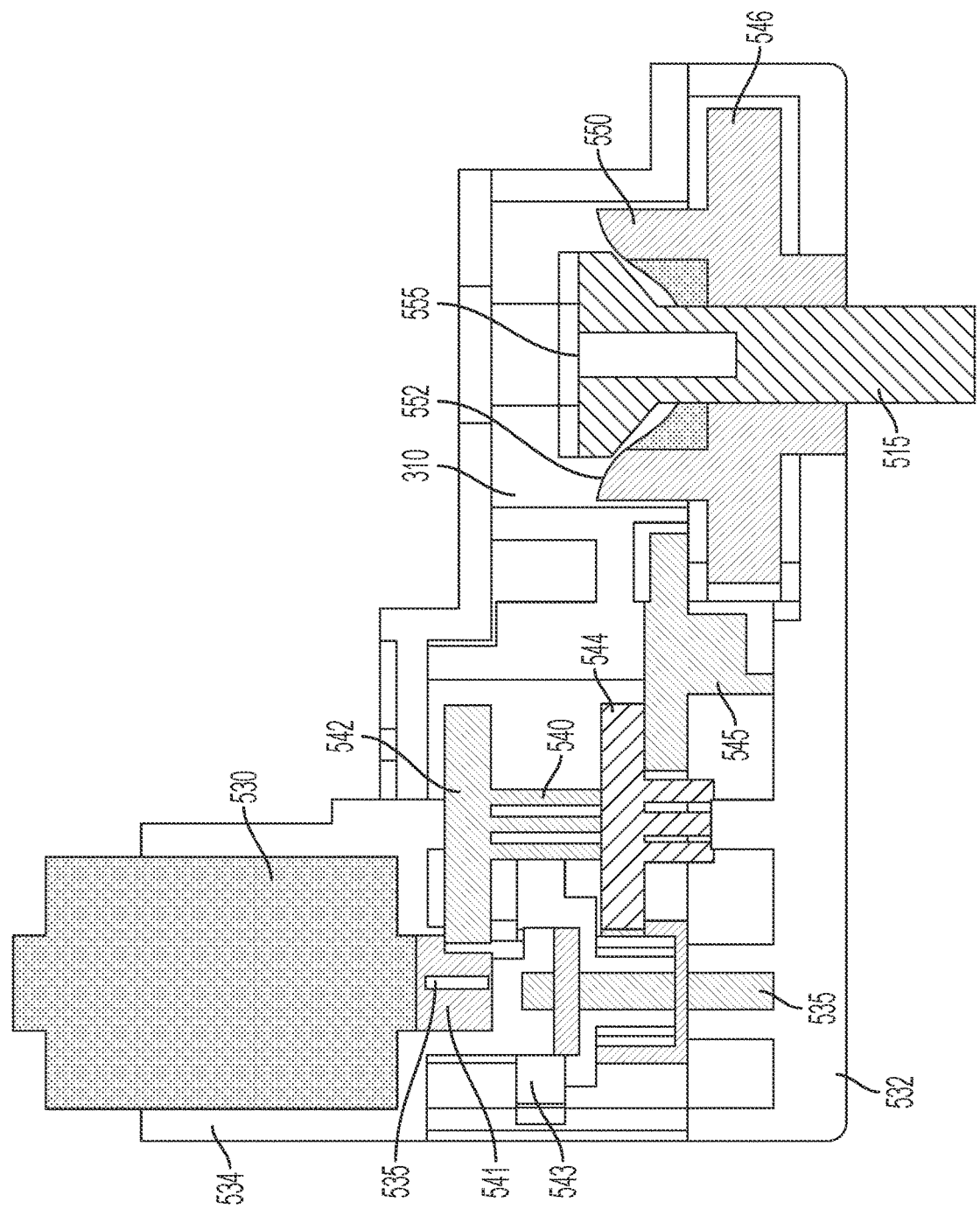
FIG. 5D is a cross-sectional view of the electric motor module of FIG. 5A. Selected gears are also seen in cross-section, along with the drive shaft and cam.

FIG. 5B is an enlarged perspective view of the electric motor module 530 of FIG. 5A. Gear housing 532 and module wall 556 are shown. FIG. 5C is another enlarged perspective view of the electric motor module 530 of FIG. 5A. Here, the module wall 556 is removed, exposing the gears of a gear assembly 560. FIG. 5D is a cross-sectional view of the electric motor module of FIG. 5A. Selected gears are seen in cross-section, along with the drive shaft 535 and cam 550.

Referring to FIGS. 5B, 5C and 5D together, the shaft 535 turns a gear, which is part of the gear assembly 560. The gears within the gear assembly 560 have respective shafts anchored within a gear housing 532. As the shaft 535 is turned, the progression of gears within the gear assembly 560 are rotated. In the illustrative arrangement of the system 500, the progression of gears represent a first gear 541, a second gear 542, a third gear 543, a fourth gear 544, a fifth gear 545 and a sixth gear 546. The first gear 541 and the third gear 543 are connected by the drive shaft 535, while the second gear 542 and the fourth gear 544 are connected by a separate geared shaft 540. It is understood that the present invention is not limited by the number or arrangement of gears used unless expressly so stated in the claims.

In the arrangement of FIG. 5D, the sixth gear 546 is integral to the cam body 550. Thus, as the gear 546 turns, the cam body 550 is also turned 550. The cam body 550 has a cam surface 552. The cam surface 552 has a sinusoidal profile. An actuation arm 555 resides along the cam surface 552, but is connected to the canister 510. Those of ordinary skill in the intuitive arts will understand that as the cam 550 rotates with its cam surface 552, the actuation arm 555 will be cyclically depressed and released. Depression of the actuating arm 555 causes the shoulder 212 of the canister 510 to be depressed, momentarily releasing pressurized behavior modification fluid through the nozzle 515.

Based on the above description of the animal behavior modification device 100 and electric motor modules 230, 530, methods for modifying the behavior of an animal is offered herein. In one embodiment, a method first includes providing a spray training system. The spray training system may be arranged in accordance with any of the embodiments described above. Of interest, the spray training system will have a canister containing a pre-pressurized fluid. The spray training system also includes an electrical motor module configured to cause the pre-pressurized fluid to be released from the canister in response to an electrical signal from a signal filter and processor (120, 130 and/or 140).

The electric motor module comprises a drive shaft, and then one or more gears making up a gear assembly. Rotation of the shaft induces a turning of the gears within a gear assembly, which ultimately converts rotational movement into a linear movement. The linear movement produces a momentary downward force to a shoulder associated with a spray nozzle on the canister.

In one embodiment, the linear movement is produced in a motor arm. The motor arm, in turn, causes a pivoting actuation arm to depress the spray nozzle associated with the canister. This briefly releases a bark deterrent fluid from the canister. Thereafter, the motor module reverses the rotational direction of the shaft, causing the elongated motor arm to reverse linear course and to return to its original position. This, in turn, pivots the actuation arm back to its resting position, wherein the spray nozzle is closed and bark deterrent fluid is no longer released. Alternatively, the reversal of the motor module may be accomplished through the contact and actuation of an electric switch positioned in the path of the moving actuation arm. Alternatively still, the elongated arm is returned to its original position by continuing to rotate the last gear 262 in accordance with a rack-and-pinion arrangement.

In another embodiment, the linear movement is produced by means of a cam body having a cam surface. Rotation of the cam surface against a transverse actuation arm associated with the spray nozzle causes a cyclical depression of the nozzle. Note that this is not a pumping action.

The method next includes securing the animal behavior modification device 100 to a collar. As noted above, a collar is shown at 600, affixed to a dog 650. Securing the device 100 to a collar 600 of a dog 650 preferably comprises connecting the housing 300 to the collar 600. The device 100 is positioned so that as the stream of bark deterrent fluid is released from the spray nozzle 166, the fluid affects the dog's senses, such as smell. Of course, the collar 600 may represent a harness as well.

In one aspect, the bark deterrent fluid comprises a solution that is offensive to one or more senses of a dog. For example, the fluid may contain a component that presents an offensive smell. In another example, the fluid contains a component that temporarily stimulates the dog's senses of smell, hearing or touch. For example, the stimulant may be a deterrent fluid that mildly irritates the dog's eyes or nose.

In one aspect, the animal behavior modification device 100 further comprises a speaker 610. The speaker 610 is configured to emit a sound that emulates a spray of fluid. The sound is emitted in response to conditioned electrical signals from the signal conditioning 130 indicative of the bark of a dog. In this instance, the sense will be the sense of hearing.

In one embodiment, the method also includes removing a first canister 162 from the fluid intake when the bark deterrent fluid is substantially exhausted, and then replacing the canister with a second canister having also a bark deterrent fluid.

In one embodiment, the method further comprises adjusting the spray nozzle. Adjusting the spray nozzle may mean adjusting the nozzle to create a fine mist or, alternatively, a heavy fluid stream of the bark deterrent fluid.

In one aspect, the animal behavior modification device 100 further comprises a remote transmitter (seen in FIG. 1 at 150) The remote transmitter 150 is configured to send a wireless activation signal in response to manual actuation by a trainer or pet owner. The signal is sent to a receiver 155 associated with the device 100.

Figure 6:
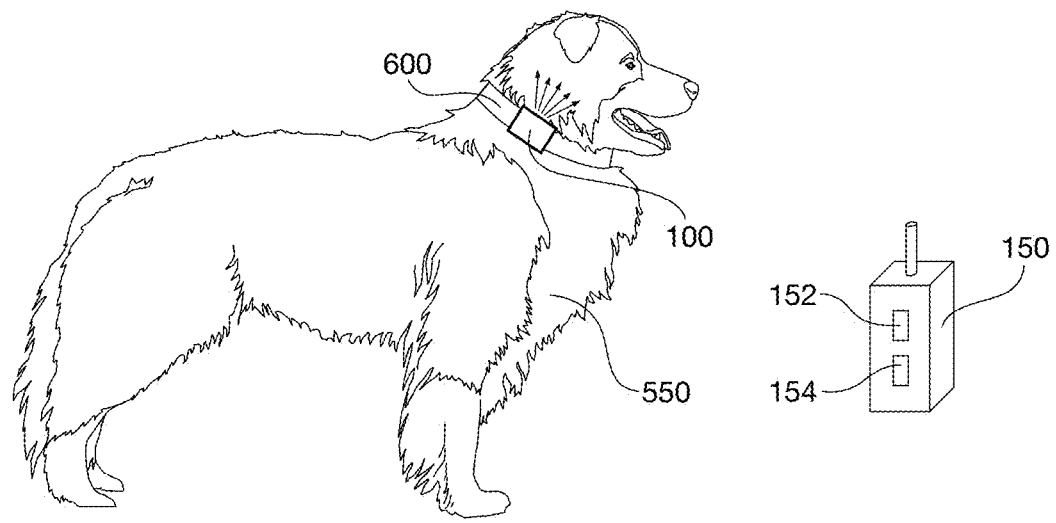
FIG. 6 is a schematic view of the animal behavior modification device of FIG. 1, shown with a pet dog and affixed to a pet dog collar. The device is within the housing of FIG. 3A.

FIG. 6 illustrates use of the animal behavior modification device 100 of FIG. 1, with a remote transmitter. The remote transmitter 150 is intended to be held and used by an owner or trainer (not shown). In this arrangement, the device 100 is shown secured to a collar 600 placed around the neck of a dog 650.

In this instance, the device 100 will further include the receiver 155 configured to receive wireless activation signals sent manually by the operator of the remote transmitter 150, and in response generate an electrical behavior modification signal. The signal activates the motor module 164, which in turn activates the actuation arm that then releases pressurized fluid from the first canister 162. This, in turn, causes a stream of the bark deterrent fluid to be released through the spray valve 166 and through the opening 515.

Button 152 is shown in FIG. 6, indicating a button 152 that may be pushed by the pet owner or trainer to manually and remotely actuate the motor module 164. Pushing button 152 sends a bark deterrent signal, which ultimately causes the canister 162 to emit the deterrent spray through the valve 166 and the through-opening 515.

In one embodiment, the animal behavior modification device 100 further comprises a second canister 168. The second canister 168 contains a behavior reinforcement fluid. The behavior reinforcement fluid comprises a solution or otherwise contains a component that is pleasing to a dog's sense of smell. The first canister 162 is removed from the housing 300, and the second canister 168 is installed in the slot 335.

In this instance, the device 100 may again include a remote transmitter 150 configured to send a wireless activation signal in response to manual actuation, and a receiver 155 configured to receive the wireless activation signal.

Here, the wireless activation signal is a behavior reinforcement signal. Pushing button 154 sends a behavior reinforcement signal, which ultimately causes the spray mechanism 160 to emit the reinforcement spray through the nozzle or valve 166.

In response to the signal, an electrical behavior modification signal is sent to the motor module 164. Here, the electrical motor 164 is configured to operate for a time to depress the spray nozzle 166 and to release fluid pressurized from the second canister 168. This, in turn, causes a stream of the behavior reinforcement fluid to be released through the spray nozzle 166.

In one arrangement, each of the canisters (or tanks) 162, 168 is fabricated from a bio-degradable material, such as a bioplastic. Examples include cellulose esters, polybutylene succinate (PBS), polyanhydrides, polyhydroxyalkanoates (PHA's), lignin based plastics and polylactic acid (PLA).

Variations of the method for modifying the behavior of an animal using a behavior modification device may fall within the spirit of the claims, below. For example, in one embodiment the pet training device may be set up as two different components, with one component housing the tank(s) 162, 168 and associated motor module 164, and another component housing the sound detection device and associated signal processing circuitry.

Figure 7:
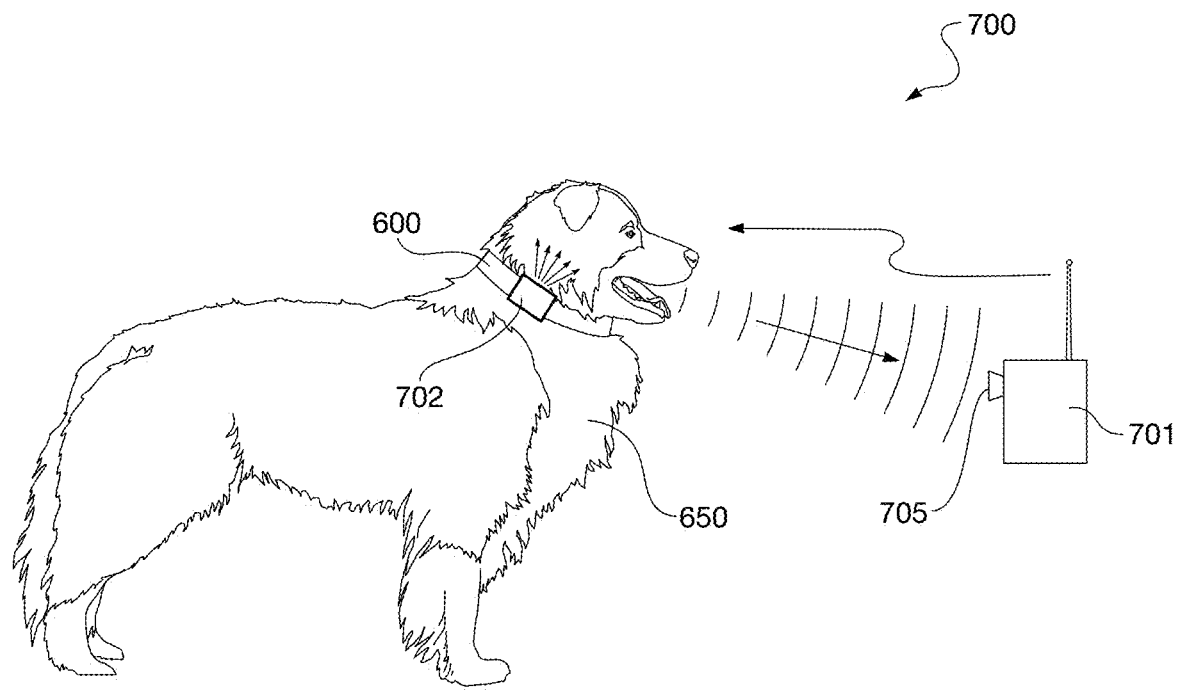
FIG. 7 is a schematic view of the animal behavior modification device of FIG. 1, shown with a pet dog and affixed to a pet dog collar.

FIG. 7 illustrates a pet training device 700 in such an alternative embodiment. Here, the pet training device 700 includes a remote transmitter 701 housed separately and apart from the collar mounted spray device 702. The remote transmitter 701 includes a sound detector 705, in the form of a microphone. The remote transmitter 701 is configured to send a wireless activation signal in response to the detection of recognized frequencies characteristic of the bark of a dog or other designated sound. The wireless activation signal is received by the collar mounted spray device 702, which then automatically actuates the electrical motor 164 to release fluid from the canister 162. This, in turn, causes a stream of the bark deterrent fluid to be automatically released through the spray nozzle 166. Thus, a person does not have to be present to active the remote transmitter 701. Accordingly, the remote transmitter may be placed in an area wherein the dog is taught not to bark such as a bedroom, office or nursery. At the same time, the dog's bark does not activate the system should the barking occur outside the range of the remote transmitter.

Figure 8:
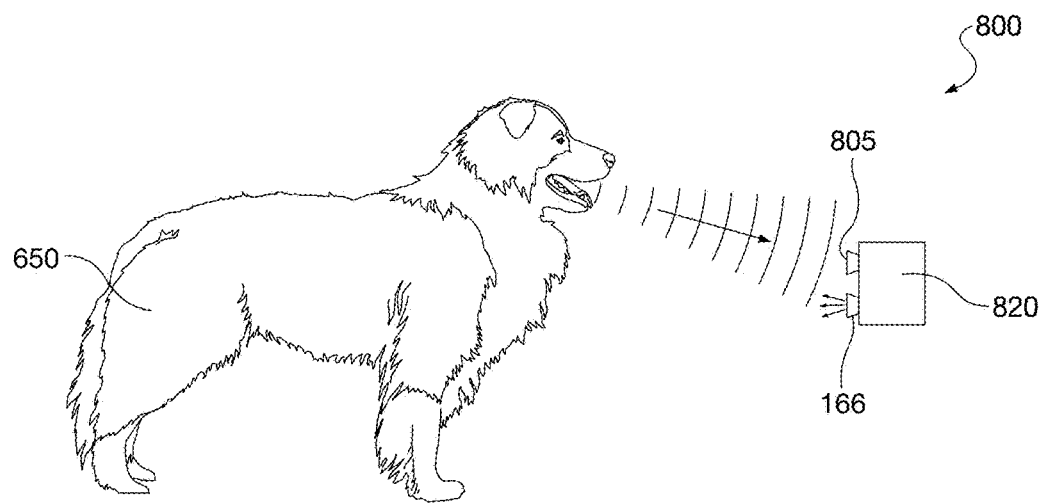
FIG. 8 is a schematic view of the animal behavior modification device of FIG. 1, shown with a pet dog.

In a related arrangement, all components of the pet spray training device are housed in a single remote housing that is apart from an animal collar. FIG. 8 illustrates a pet training device 800 in such an alternative embodiment. The pet training device 800 is separate and apart from the pet 650 to be trained and is therefore referenced herein as stationary or free-standing even though it may be moved to different locations.

The device 800 is similar to the previously disclosed device 700 except that it is not coupled to a collar worn by the pet 650. This is ideal for pets who do not wear a collar. Here, the device 800 includes a sound detector 805 in the form of a microphone and filter. The microphone 805 is configured to send an activation signal in response to the detection of recognized frequencies characteristic of the bark of a dog or other designated sound. The activation signal automatically actuates the electrical motor 164 to depress a spray nozzle 166 associated with the canister 162. This, in turn, causes a stream of the pressurized bark deterrent fluid to be automatically released through the spray nozzle 166. Thus, a person does not have to be present to activate the device 800.

The device 800 may be placed in an area wherein the dog is taught not to bark. Examples again include a nursery or a bedroom. Other examples include a kitchen, an office, a dining room or at the front door. The dog's bark does not activate the system should the barking occur outside the range of the microphone 805. In the arrangement for the device 800, components are all held within a single housing 820.

Figure 9:
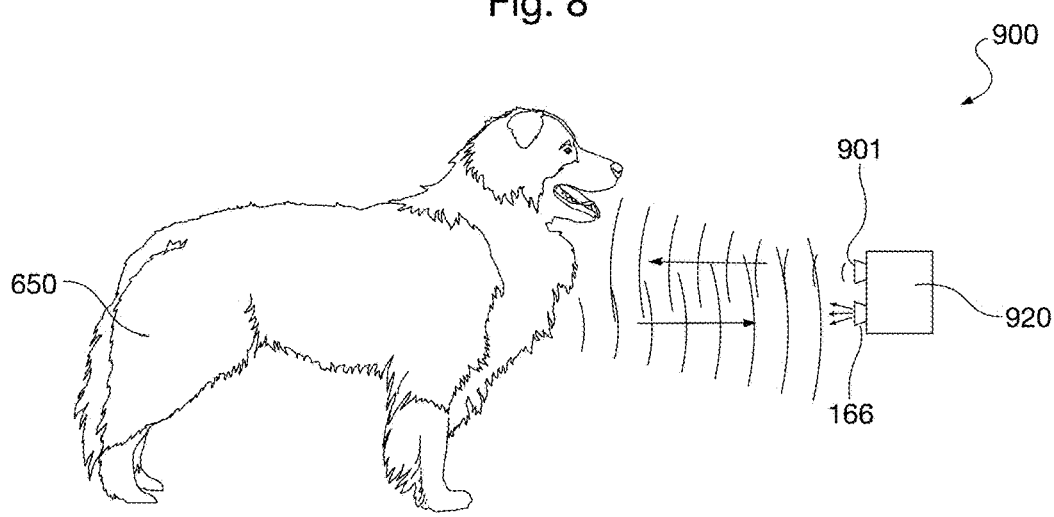
FIG. 9 is a schematic view of the animal behavior modification device of FIG. 1, shown with a pet dog.
Figure 10:
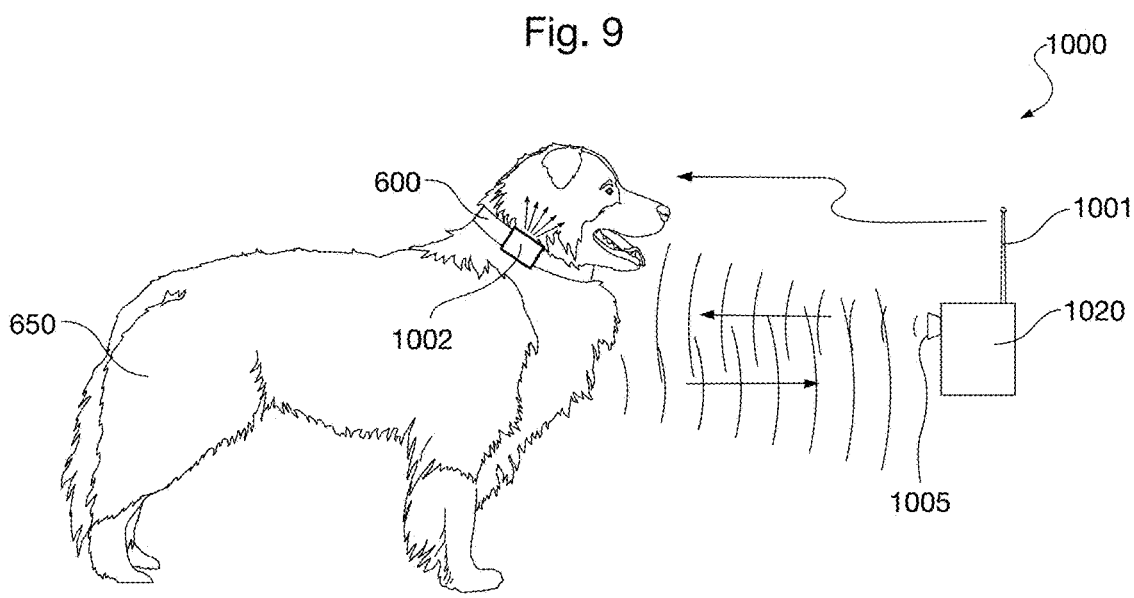
FIG. 10 is a schematic view of the animal behavior modification device of FIG. 1, shown with a pet dog and affixed to a pet dog collar.

In another embodiment, an animal behavior modification device in the form of a spray trainer may be used to deter a pet from entering an area. The area may be, for example, a bed, a couch, a kitchen, a table top or an item of furniture. FIGS. 9 and 10 demonstrate embodiments of such spray training devices.

First, FIG. 9 illustrates another pet training device 900 wherein the training device 900 is separate and apart from the pet 650 to be trained. Such a device is similar to device 800 of FIG. 7 in that it is portable and free-standing. In this instance, again, the pet 650 need not wear a collar. The device 900 may be moved from room-to-room or even packed and taken with the owner in a car to a new location.

Instead of a sound detection device, the device 900 includes a motion sensor 901. The motion sensor 901 is configured to sense the proximity of the pet 650. The device again includes a housing 920 to which the motion sensor 901 is mounted. The motion sensor 901 sends an activation signal in response to the detection of animal movement in the area of the device. The device 100 of FIG. 1 demonstrating a sensor 110 along with an optional amplifier 120, signal conditioner 130 and processor 140 is applicable to a motion sensor and its resulting electrical signal.

The device also includes a canister 162. The canister 162 is again configured to hold a deterrent fluid at positive pressure. The deterrent fluid may include a fragrance or chemical that is offensive to one or more senses of the pet. The canister 162 is further configured to reside on a surface, such as a table or a counter. In this embodiment, the device is not secured to the animal itself by means of a collar; rather, the device is free-standing and resides in the area from which the pet 650 is to be deterred from entering.

The device additionally includes a motor module and a gear assembly as previously described. The motor module 164 is electrically coupled to the motion sensor 110 and is in fluid communication with the canister. The motor module 164 depresses a spray nozzle 166 associated with a canister 162 for releasing, or discharging, a stream of the deterrent fluid in response to the electrical signals.

Ideally, the device 900 is placed in an area wherein the dog 650 is taught not to enter, while the dog's movement does not activate the device 900 outside the range of the motion detector 901. In this manner, the dog 650 is taught not to enter select areas of a home or other space.

FIG. 10 illustrates a pet training device 1000 in a related alternative embodiment. Here, the device 1000 again includes a motion detector 1005. The pet training device 1000 also includes a remote transmitter 1001. The motion detector 1005 and the transmitter 1001 are housed separately and apart from the collar 600 with the mounted spray device 1002. A housing for the motion detector 1005 and the transmitter 1001 is shown at 1020.

In operation, the remote transmitter 1001 sends a wireless activation signal in response to the detection of pet movement by the motion sensor 1005. The wireless activation signal is received by the collar mounted spray device 1002 which then automatically actuates the electrical motor to activate a motor module 164 for a period of time and cause a spray nozzle 166 associated with the canister 162 to be depressed. The period of time may be, for example, 1 to 5 seconds, or 2 to 3 seconds. This, in turn, causes an emission of the deterrent fluid through the spray nozzle 166 associated with the collar 600. Thus, a person does not have to be present to active the remote transmitter 1001. Accordingly, the remote transmitter may be placed in an area wherein the dog is taught not to enter, while the dog's movement does not activate the device 1002 should the movement occur outside the range of the remote transmitter 1001. In this manner, the dog 650 is taught not to enter only select areas of a home.

In one aspect of the pet training device 1000, either the housing 1020 or the collar 600 includes a speaker (shown at 610 in FIG. 1). The speaker 610 may emit ultrasonic sound waves audible only to the dog 650. The sound waves serve as a bark deterrent. Alternatively, the speaker 610 simulates the sound of the spray nozzle to elicit a Pavlovian stopping of the barking.

It will be appreciated that the inventions are susceptible to modification, variation and change without departing from the spirit thereof.

We claim:

1. An animal behavior modification device comprising:
    a hand-operated transmitter adapted to transmit an actuation signal;
    a housing configured to reside on a collar of a canine;
    a receiver residing along the housing and adapted to receive the actuation signal from the transmitter, and then generate an electrical activation signal in response;
    a pressurized fluid cartridge residing within the housing, and containing a bark deterrent fluid, the pressurized fluid cartridge having a spray nozzle;
    a motor module electrically coupled to the receiver and also residing within the housing, the motor module being activated upon receiving the activation signal from the receiver to rotate a motor shaft;
    an actuation arm operatively coupled to the motor shaft through a gear assembly such that rotation of the motor shaft and associated gear assembly for a period of time generates rotational movement of a cam body, wherein the rotational movement of the cam body generates movement of the actuation arm, wherein the actuation arm intersects a rotational axis of the cam body, wherein the movement of the actuation arm engages the pressurized fluid cartridge to release the bark deterrent fluid through the spray nozzle; and
    a battery electrically coupled to the motor module.

2. The animal behavior modification device of claim 1, further comprising:
    a through-opening in the housing aligned with the nozzle for accommodating the release of the bark deterrent fluid.

3. The animal behavior modification device of claim 2, further comprising:
    a drive gear operatively coupled to the motor shaft as part of the gear assembly; and
    an elongated motor arm in the form of a rack-type gear configured to mesh with the drive gear, the elongated motor arm moving linearly in response to rotation of the drive gear; and
    wherein the actuation arm is pivotally coupled to the elongated motor arm for pivotal movement resulting from the linear movement of the elongated motor arm, and configured to depress the spray nozzle when the motor module is actuated, thereby releasing the pressurized bark deterrent fluid through the nozzle under pressure.

4. The animal behavior modification device of claim 3, wherein:
   the actuation arm is configured to depress the spray nozzle when the electrical motor is actuated in a first linear direction to release the bark deterrent fluid; and
   the actuation arm is further configured to release the spray nozzle when the elongated motor arm is actuated in a second linear direction opposite the first linear direction to close off the release of bark deterrent fluid.

5. The animal behavior modification device of claim 4, wherein:
   the elongated motor arm is a rack-and-pinion type gear drive configured to mesh with the drive gear; and
   the elongated motor arm is caused to move in the second linear direction by continued rotation of the drive gear beyond the period of time.

6. The animal behavior modification device of claim 2, further comprising:
   the cam body comprising a cam surface, wherein the cam body is integral to or coupled to the gear assembly, wherein the rotation of the motor shaft rotates the cam body, wherein the actuation arm is configured to ride along the cam surface such that the actuation arm is cyclically depressed and released as the cam body is rotated, wherein depressing the actuation arm causes the nozzle to be depressed, thereby releasing bark deterrent fluid from the pressurized fluid cartridge.

* * * * *